United States Patent
Namba et al.

(10) Patent No.: US 10,941,726 B2
(45) Date of Patent: Mar. 9, 2021

(54) CONTROL DEVICE FOR INTERNAL COMBUSTION ENGINE

(71) Applicant: HITACHI AUTOMOTIVE SYSTEMS, LTD., Hitachinaka (JP)

(72) Inventors: Shogo Namba, Tokyo (JP); Masayuki Saruwatari, Tokyo (JP); Kazuhiro Oryoji, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 14 days.

(21) Appl. No.: 16/341,251

(22) PCT Filed: Nov. 1, 2017

(86) PCT No.: PCT/JP2017/039484
§ 371 (c)(1),
(2) Date: Apr. 11, 2019

(87) PCT Pub. No.: WO2018/096884
PCT Pub. Date: May 31, 2018

(65) Prior Publication Data
US 2019/0316540 A1 Oct. 17, 2019

(30) Foreign Application Priority Data
Nov. 24, 2016 (JP) .............................. JP2016-227939

(51) Int. Cl.
*F02B 17/00* (2006.01)
*F02D 41/30* (2006.01)
(Continued)

(52) U.S. Cl.
CPC ...... *F02D 41/3064* (2013.01); *F02B 29/0418* (2013.01); *F02D 13/0226* (2013.01);
(Continued)

(58) Field of Classification Search
CPC ............................... F02D 41/40; F02D 41/402
(Continued)

(56) References Cited

U.S. PATENT DOCUMENTS

2005/0022514 A1* 2/2005 Kitahara ............... F02D 35/025
60/285
2005/0039443 A1* 2/2005 Kitahara ............... F02D 41/403
60/285
(Continued)

FOREIGN PATENT DOCUMENTS

JP 2007-016685 A 1/2007
JP 2012-172665 A 9/2012

OTHER PUBLICATIONS

International Search Report with English translation and Written Opinion issued in corresponding application No. PCT/JP2017/039484 dated Feb. 27, 2018.

*Primary Examiner* — John Kwon
(74) *Attorney, Agent, or Firm* — Foley & Lardner LLP

(57) ABSTRACT

Torque fluctuations caused by misfire and abnormal combustion are prevented appropriately at the time of switching from SI to HCCI, and exhaust of NOx is restricted at the time of switching.
Provided is a control apparatus for an internal combustion engine performing a plurality of combustion modes each having a different air-fuel ratio and compression end temperature in a cylinder 7 from each other. In the middle of switching from a first combustion mode to a second combustion mode, an intermediate combustion mode in which the compression end temperature is increased while keeping a different air-fuel ratio from the air-fuel ratio of the first combustion mode and the air-fuel ratio of the second combustion mode is performed. Accordingly, at the time of switching between an operation mode performing SI and an operation mode performing HCCI, a temperature in the
(Continued)

cylinder 7 and an air-fuel ratio are controlled appropriately, torque fluctuations caused by misfire and abnormal combustion can be prevented appropriately, and exhaust of NOx can be restricted.

9 Claims, 8 Drawing Sheets

(51) Int. Cl.
  *F02B 29/04* (2006.01)
  *F02D 13/02* (2006.01)
  *F02P 5/04* (2006.01)
  *F02P 5/15* (2006.01)
(52) U.S. Cl.
  CPC .......... *F02D 13/0265* (2013.01); *F02P 5/045* (2013.01); *F02P 5/15* (2013.01)
(58) Field of Classification Search
  USPC ..... 123/27 R, 294, 295, 299, 305, 457, 434, 123/510, 511, 704
  See application file for complete search history.

(56) References Cited

U.S. PATENT DOCUMENTS

| | | | |
|---|---|---|---|
| 2005/0039444 A1* | 2/2005 | Nishizawa | F02D 41/403 60/285 |
| 2012/0216776 A1 | 8/2012 | Nagatsu | |

* cited by examiner

CONTROL DEVICE FOR INTERNAL COMBUSTION ENGINE

TECHNICAL FIELD

The present invention relates to a control device for an internal combustion engine and specifically relates to a control device for an internal combustion engine appropriate to switching between a spark ignition combustion mode and a compression self ignition combustion mode.

BACKGROUND ART

In an internal combustion engine employing a premixed flame propagation combustion system by means of spark ignition, when a compression ratio is excessively raised for the purpose of improvement in thermal efficiency, abnormal combustion such as knocking and preignition occurs. Hence, improvement in thermal efficiency by raising the compression ratio has limitations. Under such circumstances, an internal combustion engine employing a homogeneous charge compression ignition (hereinbelow referred simply as HCCI) system, in which a combustible gas mixture diluted by inert gas such as exhaust gas is compressed by a piston to perform self ignition combustion, is being developed.

CITATION LIST

Patent Literature

PTL 1: JP 2007-16685 A

SUMMARY OF INVENTION

Technical Problem

The internal combustion engine employing the HCCI system enables the compression ratio to be set to be higher than that in an internal combustion engine employing a conventional spark ignition (hereinbelow referred simply as SI) system and enables a cooling loss and NOx to be reduced due to lowering of a combustion temperature caused by lean combustion. However, in the HCCI, since ignition timing depends on a chemical reaction process in the compression stroke, the temperature in the cylinder, the ratio of dilution using inert gas, fuel injection timing, and the like need to be controlled precisely.

In the HCCI-system internal combustion engine, the operational range achieving normal combustion is narrower than that of the conventional SI-system internal combustion engine and cannot cover the entire practical operational range. For this reason, switching between an SI mode and an HCCI mode is required. Since the SI mode and the HCCI mode have quite different establishment conditions, simply changing a control value at the time of switching of the combustion mode causes a problem in which torque fluctuations occur.

As a means to solve the problem, PTL 1 discloses a control device for an internal combustion engine, at the time of switching from an SI mode to an HCCI mode, conducting two SI modes, a homogeneous state and a stratified state, as intermediate states. According to the control device in PTL 1, torque fluctuations can be prevented appropriately at the time of switching of the combustion mode.

In the technique of PTL 1, torque fluctuations at the time of switching from the SI to the HCCI can be restricted. However, at the time of switching from the SI to the HCCI, an air-fuel ratio (hereinbelow, an A/F) is caused to be continuously in a lean state. For this reason, since combustion in a state in which the A/F is close to a stoichiometric ratio and is in a leaner state than the stoichiometric ratio is gone through, the combustion temperature is relatively high, which causes a problem of generating a large amount of NOx. Also, stratified lean combustion is gone through, which causes a problem of increasing the amount of NOx.

The present invention is accomplished by taking such problems as mentioned above into consideration thereof, and an object thereof is to provide a control device for an internal combustion engine enabling torque fluctuations caused by misfire and abnormal combustion to be prevented appropriately at the time of switching from SI to HCCI and enabling exhaust of NOx to be restricted at the time of switching.

Solution to Problem

To solve the above problem, a control device according to the present invention is a control device for an internal combustion engine performing a plurality of combustion modes each having a different air-fuel ratio and compression end temperature in a cylinder from each other. In the middle of switching from a first combustion mode to a second combustion mode, an intermediate combustion mode in which the compression end temperature is increased while keeping a different air-fuel ratio from the air-fuel ratio of the first combustion mode and the air-fuel ratio of the second combustion mode is performed.

Advantageous Effects of Invention

According to the present invention, at the time of switching between an operation mode performing SI and an operation mode performing HCCI, a temperature in a cylinder and an air-fuel ratio are controlled appropriately. Accordingly, torque fluctuations caused by misfire and abnormal combustion can be prevented appropriately, and exhaust of NOx can be restricted.

DESCRIPTION OF EMBODIMENTS

First Embodiment

Hereinbelow, a configuration and an operation of a control device (ECU 20) for an internal combustion engine 1 according to a first embodiment of the present invention will be described with reference to FIGS. 1 to 8. In the first embodiment, described are a configuration and an operation of the ECU 20 for the internal combustion engine 1 switching a combustion mode from a spark ignition combustion (hereinbelow, SI) mode to a homogeneous charge compression ignition (hereinbelow, HCCI) mode under a condition in which the HCCI is established under a non-supercharging condition.

Figure 1:
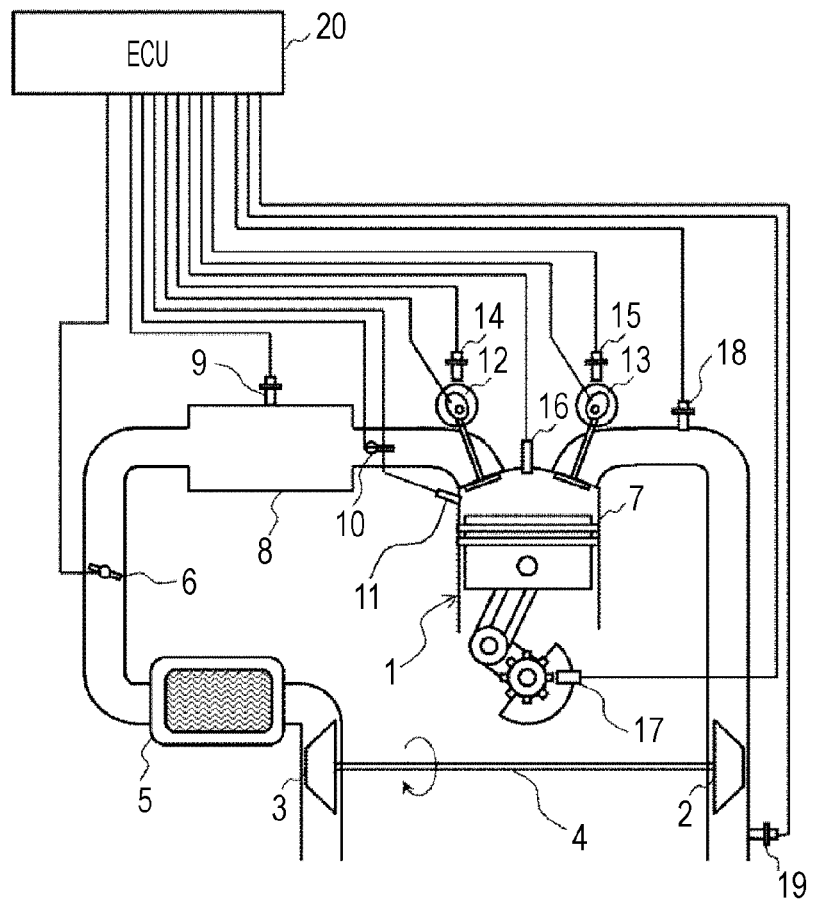
FIG. 1 illustrates a system configuration according to first and second embodiments.

FIG. 1 illustrates a system configuration according to the first embodiment of the present invention. The system according to the present embodiment includes the internal combustion engine 1. To the internal combustion engine 1, an intake flow path (intake duct) and an exhaust flow path (exhaust duct) are connected. The internal combustion engine 1 includes a turbo supercharger 4 rotating a turbine 2 by means of energy contained in exhaust air and supercharging intake air by means of a compressor 3. At the downstream of the compressor 3, an intercooler 5 is provided, and at the downstream of the intercooler 5, a throttle valve 6 adapted to throttle the intake flow path to control the intake air amount flowing into a cylinder 7 is provided. The throttle valve 6 is an electronic control throttle valve enabling a valve opening to be controlled independently from an accelerator pedal pressing amount. To the downstream of the throttle valve 6 is connected an intake manifold 8. The intake manifold 8 is provided with a temperature-and-pressure sensor 9. At the downstream of the intake manifold 8 is arranged a flow strengthening valve 10 generating drift current in the intake air to strengthen turbulence in the cylinder 7.

In the cylinder 7 is arranged an in-cylinder direct-injection-type fuel injection valve 11 directly injecting fuel into the cylinder 7. The internal combustion engine 1 includes variable valve mechanisms causing a phase and lift for valve opening and closing to be continuously variable in an intake valve 12 and an exhaust valve 13, respectively. The variable valve mechanisms are provided at the intake valve 12 and the exhaust valve 13 with sensors 14 and 15 adapted to detect the phase and the lift for valve opening and closing.

A head portion of the cylinder is provided with an ignition plug 16 exposing an electrode portion in the cylinder 7 and igniting a combustible gas mixture by means of spark. A crank shaft is provided with a crank angle sensor 17. Based on a signal output from the crank angle sensor 17, rotation speed of the internal combustion engine 1 can be detected.

The exhaust flow path is provided with a temperature-and-pressure sensor 18 adapted to detect a temperature and pressure of exhaust gas. At the downstream of the temperature-and-pressure sensor 18 in the exhaust flow path, the turbine 2 is arranged. At the downstream of the turbine 2, an air-fuel ratio sensor 19 is provided, and feedback control is performed so that the fuel injection amount supplied from the fuel injection valve 11 may have a targeted air-fuel ratio based on a detection result of the air-fuel ratio sensor 19.

The system according to the present embodiment includes an ECU (electronic control unit) 20 serving as a control device as illustrated in FIG. 1. The ECU 20 is connected to the aforementioned various sensors and actuators. The actuators such as the throttle valve 6, the fuel injection valve 11, and the intake and exhaust valves 12 and 13 with the variable mechanisms are controlled by the ECU 20. Also, an operation state of the internal combustion engine 1 is detected based on signals input by the aforementioned various sensors, and the ignition plug 16 ignites at a time determined by the ECU 20 in accordance with the operation state.

Figure 2:
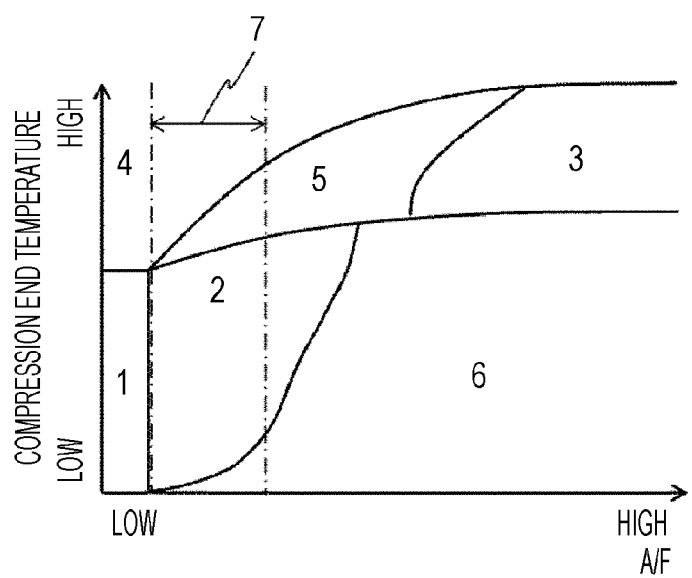
FIG. 2 describes operable regions based on an A/F and a compression end temperature.

FIG. 2 describes operable regions of the SI, the HCCI, and homogeneous lean spark ignition combustion (hereinbelow, lean SI) based on an air-fuel ratio (hereinbelow, an A/F) and a compression end temperature in the cylinder 7. Hereinbelow, the compression end temperature represents an in-cylinder temperature immediately before ignition in the case of the SI and an in-cylinder temperature immediately before ignition of a gas mixture in the case of the HCCI. A region 1 represents an SI region in which the operation is performed around a stoichiometric ratio (hereinbelow, an SI region), and a region 2 represents a region in which the gas mixture is burned as the SI in a stable manner in a case in which the gas mixture is homogeneous and lean. Meanwhile, "around a stoichiometric ratio" includes a range in which NOx in the exhaust air can be purified with use of a ternary catalyst.

A region 3 represents a region in which spark ignition by means of the ignition plug 16 is stopped, and in which combustion is performed by self ignition of the gas mixture (hereinbelow, an HCCI region). A region 4 represents a region of the SI. The region 4 also represents a region in which knocking is generated due to an increase of the compression end temperature (hereinbelow, an SI knocking region).

A region 5 represents a region in which knocking is generated due to an increase of the compression end temperature in a case of operation in the SI and HCCI modes (hereinbelow, an HCCI knocking region). A region 6 represents a region in which misfire is generated due to a decrease of the compression end temperature and an increase of the A/F (hereinbelow, a misfire region). A region 7 represents a region in which the A/F of the gas mixture is in a lean state relatively around the stoichiometric ratio and in which a large amount of NOx is exhausted in a process of a chemical reaction due to a high combustion temperature (hereinbelow, a large amount of NOx generating region).

At the time of switching from the SI region in the region 1 to the HCCI region in the region 3, an appropriate switching control unit is required since the A/F ratios significantly differ from each other. However, in consideration of responsiveness of the various actuators, it is difficult to switch the region from the region 1 to the region 3 immediately. For this reason, at the time of switching from the SI region in the region 1 to the HCCI region in the region 3, the switching needs to be performed by means of an appropriate control unit without passing through the regions 4 to 7.

Figure 3:
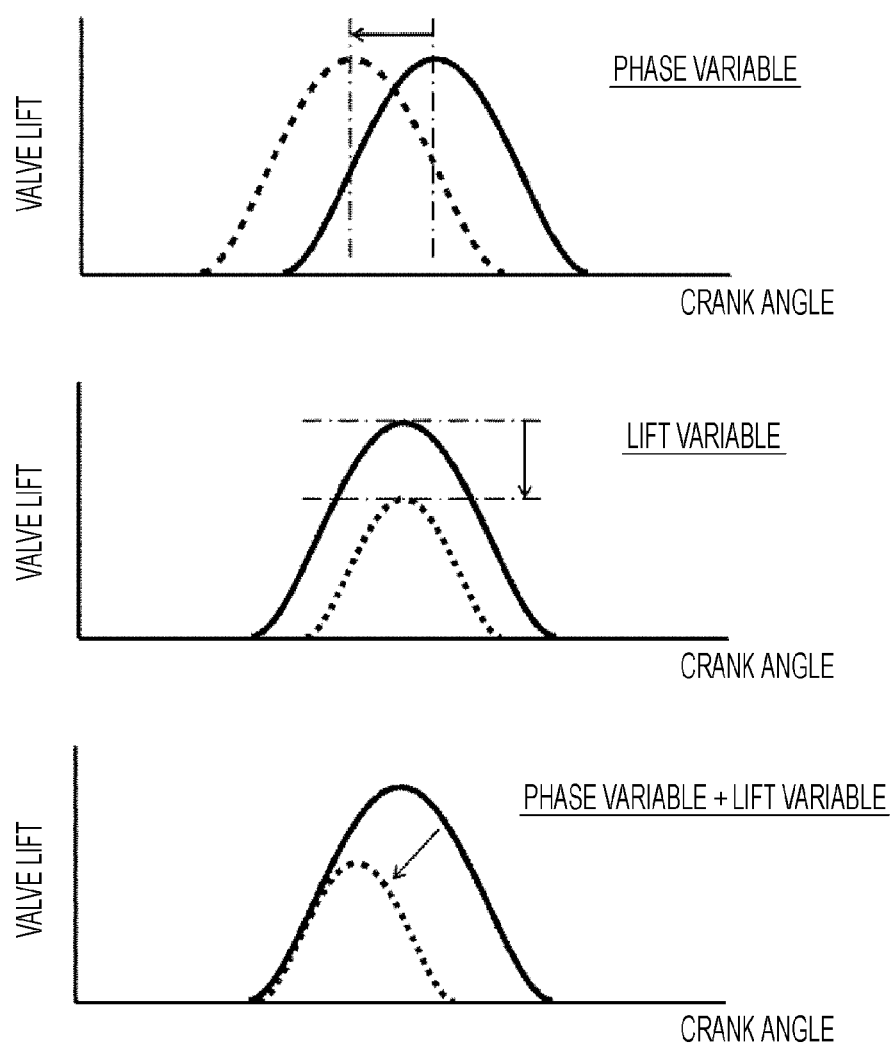
FIG. 3 describes an intake/exhaust valve profile of an internal combustion engine including phase-and-lift variable valve mechanisms in an intake valve and an exhaust valve.

FIG. 3 describes operation methods of a phase-variable-type variable valve mechanism and a lift-variable-type variable valve mechanism. In the phase-variable-type variable valve mechanism, only the phase can be varied with a valve opening period (hereinbelow, a valve operation angle) constant. In the lift-variable-type variable valve mechanism, the valve lift and the operating angle can be varied at the same time. By using both the phase-variable-type variable valve mechanism and the lift-variable-type variable valve mechanism, the phase and the lift can be varied at the same time in a state in which either a valve opening time or a valve closing time is fixed.

Figure 4:
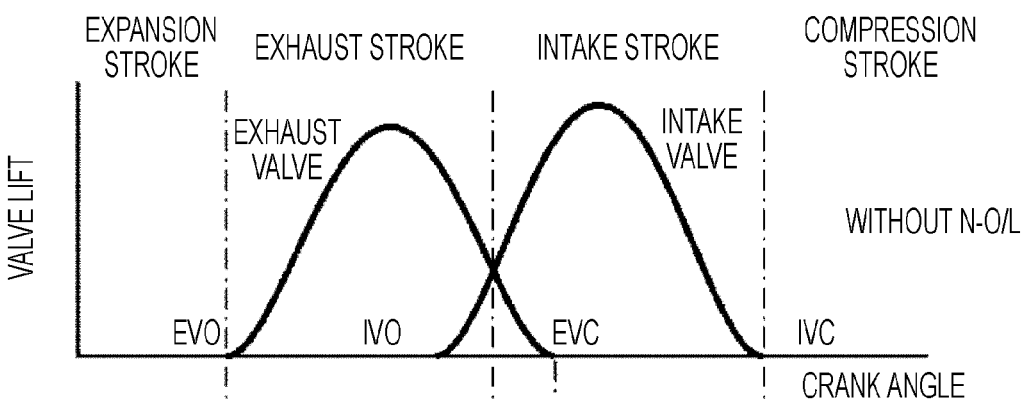
FIG. 4 describes changes of state amounts in the cylinder resulting from operation of the intake/exhaust valve profile of the internal combustion engine including the phase-and-lift variable valve mechanisms in the intake valve and the exhaust valve.
Figure 4:
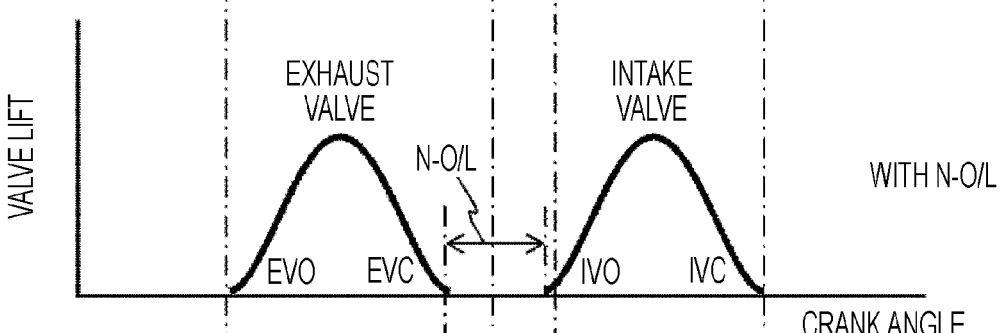
Figure 4:
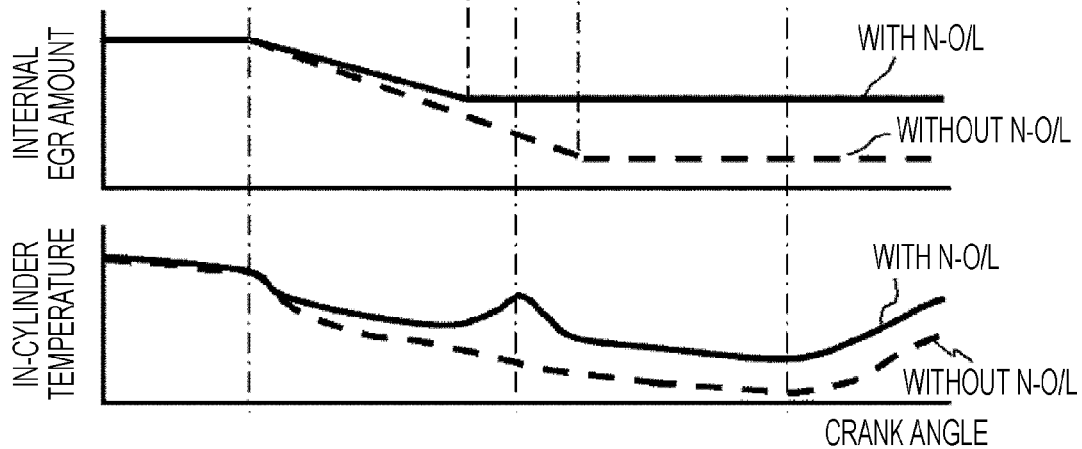

FIG. 4 illustrates a temperature increase effect with use of the phase-variable-type variable valve mechanism and the lift-variable-type variable valve mechanism. EVO, EVC, IVO, and IVC illustrated in FIG. 4 represent an exhaust valve opening time, an exhaust valve closing time, an intake valve opening time, and an intake valve closing time, respectively. By operating the phase and the lift at the same time with use of the phase-variable-type variable valve mechanism and the lift-variable-type variable valve mechanism, the valve opening/closing profile in FIG. 4(a) representing the phases and the lift amounts of the intake valve and the exhaust valve can be changed into that in FIG. 4(b).

In FIG. 4(b), due to changes of the phases and the lift amounts of the valves, the amount of negative overlap (hereinbelow, N-O/L), in which the intake valve and the exhaust valve are closed at the same time, increases. Hence, as illustrated in FIG. 4(c), since the amount of high-temperature exhaust gas trapped in the cylinder 7 (hereinbelow, an internal EGR gas amount) increases, the in-cylinder temperature at the intake valve closing time increases. Consequently, the compression end temperature in the SI and HCCI cases is higher in a case in which the N-O/L exists than in a case in which the N-O/L does not exist.

Figure 5:
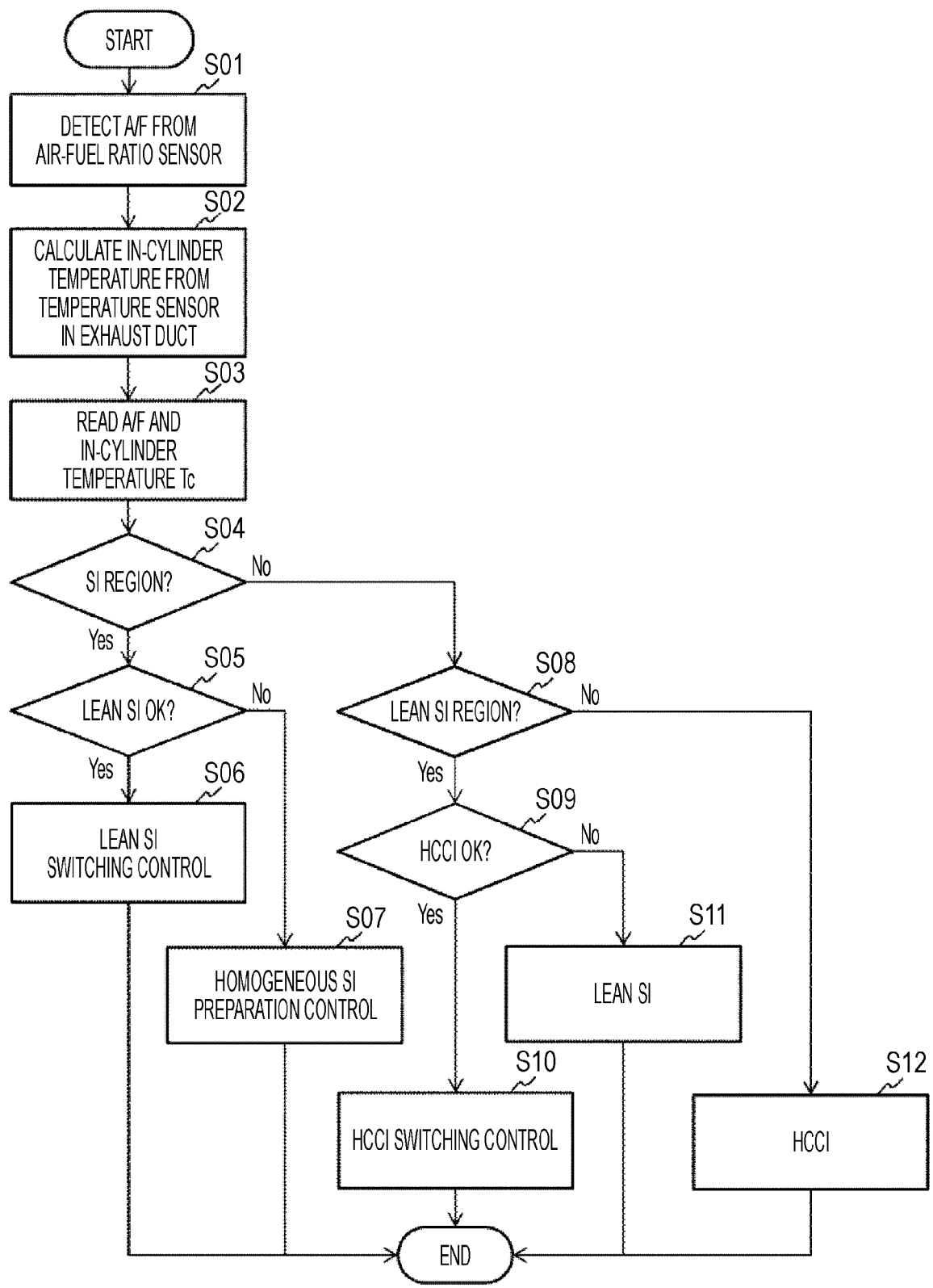
FIG. 5 is a flowchart illustrating control at the time of switching from SI to HCCI.

FIG. 5 is a flowchart illustrating control by the ECU 20 from the SI to the HCCI.

In step S01, the A/F is detected from the air-fuel ratio sensor 19. In step S02, a compression end temperature Tc is estimated from the temperature-and-pressure sensor 9 and the exhaust variable position sensor 15.

In the above estimation, the intake air temperature and the intake air pressure are detected by the temperature-and-pressure sensor 9, and the closing time of the exhaust valve 13 is detected by the exhaust variable position sensor 15, to estimate the internal EGR gas amount. By the above detection and estimation, the in-cylinder temperature at the closing time of the intake valve 12 detected by the intake variable position sensor 14 is estimated, and the estimated value Tc of the compression end temperature is calculated by calculation assuming adiabatic compression. In the intake step S03, the A/F and the in-cylinder temperature Tc in steps S01 and S02 are read. In step S04, it is determined whether the current combustion mode is a spark ignition combustion mode (hereinbelow, an SI mode).

In the above determination method, in a case in which the compression end temperature Tc is lower than a knocking limitation temperature TSknock of the SI (Tc<TSknock) in a state in which the A/F is kept around the stoichiometric ratio, it is determined that the current region is the operation region in the SI mode (Mode-1) (S04: YES), and the procedure moves to step S05. In a case in which the compression end temperature Tc is higher than the knocking limitation temperature TSknock of the SI (Tc>TSknock) (S04: NO), the procedure moves to step S08.

Figure 6:
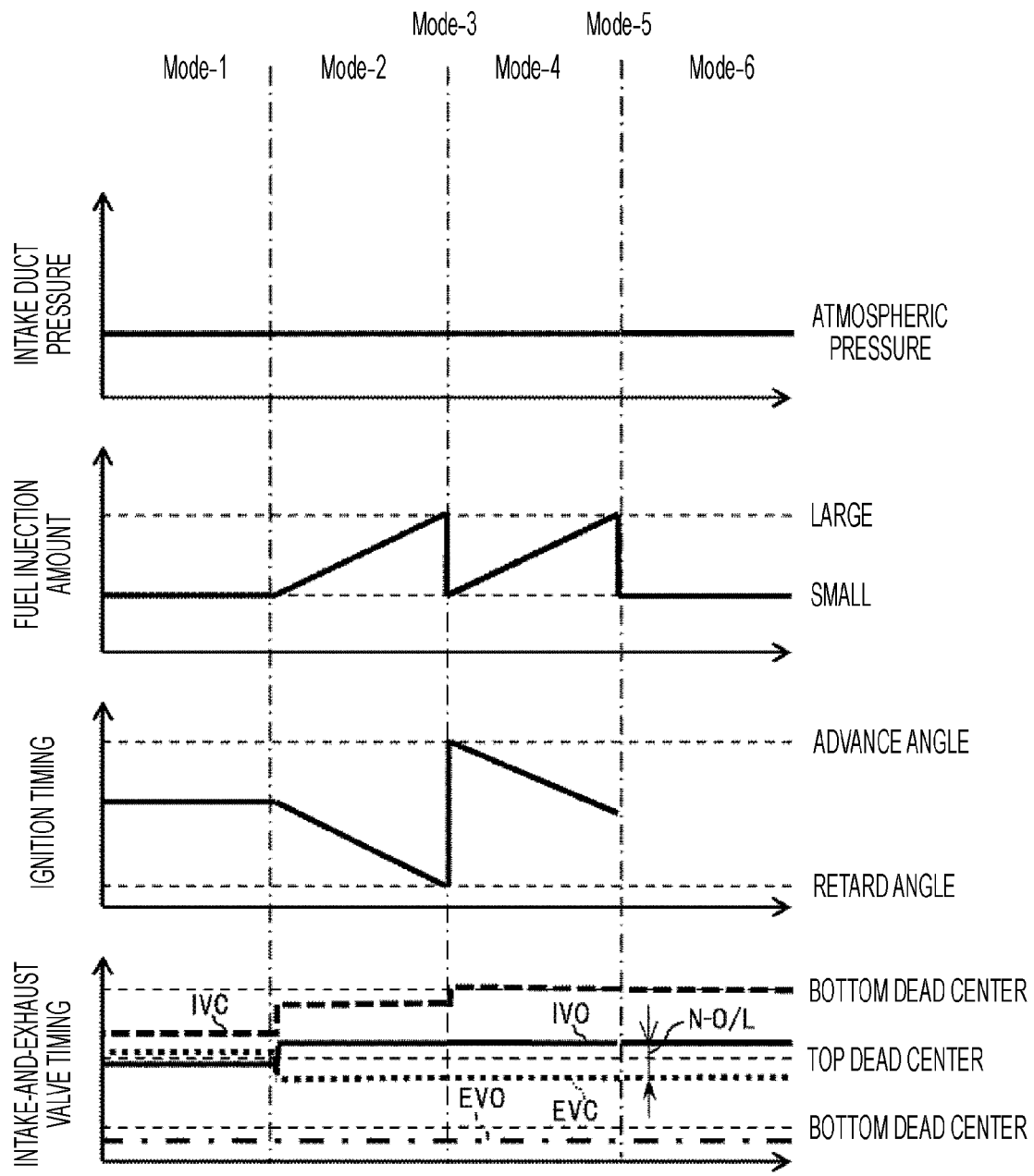
FIG. 6 describes changes of respective control target values at the time of switching from the SI to the HCCI in the first embodiment.

In step S05, it is determined whether the lean SI is possible at the A/F and the compression end temperature Tc read in step S03. In the above determination method, in a case in which the compression end temperature Tc is higher than a stable combustion limitation temperature Tlimit of the lean SI and is lower than a knocking limitation temperature TLknock of the homogeneous SI (Tlimit<Tc<TLknock), it is determined that the operation can be performed in the lean SI mode (S05: YES), and the procedure moves to step S06. In step S06, homogeneous lean spark ignition combustion switching control (Mode-3, hereinbelow, lean SI switching control) illustrated in FIG. 6 is performed. In a case in which the above conditions are not met (S05: NO), the procedure moves to step S07, and homogeneous lean spark ignition combustion preparation control (Mode-2, hereinbelow, homogeneous SI preparation control) illustrated in FIG. 6 is performed.

In step S08, it is determined whether the operation mode that does not meet the determination criteria of the SI mode is in the lean SI region.

In the above determination criteria, in a case in which the compression end temperature Tc is lower than an establishment limitation temperature THlimit of the HCCI (TC<THlimit) in a state in which the A/F is kept around the stable combustion limitation of the lean SI, it is determined that the current region is the lean SI region (S08: YES), and the procedure moves to step S09. In the above determination criteria, in a case in which the compression end temperature Tc is higher than the establishment limitation temperature THlimit of the HCCI (TC>THlimit) in a state in which the A/F is kept around the stable combustion limitation of the lean SI (S08: NO), the procedure moves to step S12, and a compression self ignition combustion mode (Mode-6, hereinbelow, an HCCI mode) illustrated in FIG. 6 is performed.

In step S09, it is determined whether the HCCI is possible at the A/F and the in-cylinder temperature Tc read in step S03. In the above determination method, in a case in which the compression end temperature Tc is around the knocking limitation temperature TLknock of the homogeneous SI (Tc≈TLknock), it is determined that the operation can be performed in the HCCI (S09: YES), the procedure moves to step S10, and a compression self ignition combustion switching mode (Mode-5, hereinbelow, HCCI switching control) illustrated in FIG. 6 is performed. In a case in which the above conditions are not met (S08: NO), the procedure moves to step S11, and a homogeneous lean spark ignition combustion control mode (Mode-4, hereinbelow, a lean SI mode) serving as "an intermediate combustion mode" illustrated in FIG. 6 is performed.

Figure 7:
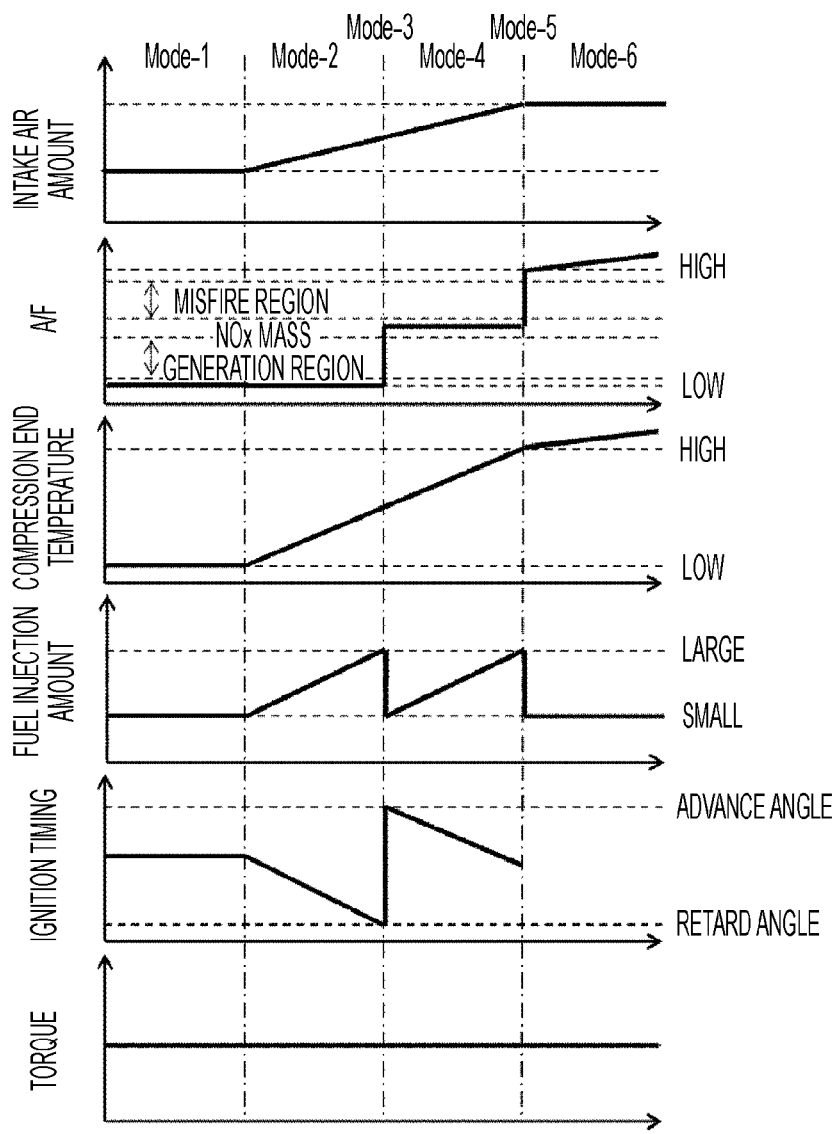
FIG. 7 describes changes of respective state amounts at the time of switching from the SI to the HCCI.

FIG. 6 describes changes of respective control target values at the time of switching from the SI to the HCCI. The horizontal axis represents time, and the vertical axis represents respective control target values of intake duct pressure, a fuel injection amount, ignition timing, and intake-and-exhaust valve timing. FIG. 7 describes changes of respective state amounts at the time of switching from the SI to the HCCI. The horizontal axis represents time, and the vertical axis represents respective state amounts of an intake air amount, the A/F, the compression end temperature, the fuel injection amount, the ignition timing, and torque.

The lean SI preparation control (Mode-2) in the first embodiment in FIG. 5 will be described. At the time of switching from the SI mode (Mode-1) to the lean SI mode (Mode-4), the homogeneous SI preparation control (Mode-2) is performed as a preparation stage as illustrated in FIG. 6. Relative to the control values of the SI, the intake valve opening time (IVO) is retarded, and the exhaust valve closing time (EVC) is advanced. Since the above valve operation is performed to increase the N-O/L amount, the internal EGR amount increases, and as a result of an increase of the in-cylinder temperature, the compression end temperature increases. By moving the intake valve closing time closer to a piston bottom dead center while increasing the operation angle of the intake valve, the substantial compression ratio is increased, and the compression end temperature is increased. By increasing the operation angle of the intake valve, the intake air amount increases. Hence, by increasing the fuel injection amount and retarding the ignition timing, the A/F is kept around the stoichiometric ratio, and the torque fluctuations are prevented from being generated, as illustrated in FIG. 7.

The lean SI switching control (Mode-3) in FIG. 5 will be described. In a case in which it is determined at the time of switching from the SI to the lean SI that the operation can be performed in the lean SI mode, the lean SI switching control illustrated in FIG. 6 is performed. By decreasing the fuel injection amount from the control value of the homogeneous SI preparation control and advancing the ignition timing relative to that before changing the A/F, undershoot of the torque along with the decrease of the fuel injection amount can be prevented, the torque fluctuations can be restricted, and switching to the lean SI can be performed.

The lean SI control (Mode-4) in FIG. 5 will be described. At the time of switching from the lean SI mode to the HCCI mode, the lean SI control is performed as a preparation stage as illustrated in FIG. 6. By further increasing the operation angle of the intake valve from the control value of the lean SI switching control, the intake air amount increases. Hence, by increasing the fuel injection amount and retarding the ignition timing, the A/F is kept around the stable combustion limitation of the lean SI, and the torque fluctuations are prevented from being generated, as illustrated in FIG. 7.

The HCCI switching control (Mode-5) in FIG. 5 will be described. In a case in which it is determined at the time of switching from the lean SI control to the HCCI that the operation can be performed in the HCCI mode, the HCCI switching control illustrated in FIG. 6 is performed. By decreasing the fuel injection amount from the control value of the lean SI control and ceasing ignition by means of the ignition plug, switching to the HCCI (Mode-6) is performed immediately while restricting generation of the torque fluctuations.

FIG. 7 illustrates various state amounts at the time of switching from the SI to the HCCI. In the lean SI preparation control (Mode-2), by increasing the intake air amount and increasing the fuel injection amount, the A/F is kept around the stoichiometric ratio. By increasing the exhaust loss and lowering the output by retarding the ignition timing, the torque fluctuations are restricted. In the lean SI switching control (Mode-3), since the fuel injection amount is decreased, and the A/F of the gas mixture can be controlled under target conditions per cycle, switching to the lean SI control (Mode-4) can be performed without passing through the large amount of NOx generating region. The NOx exhaust amount can thus be decreased. Also, by advancing the ignition timing relative to that before changing the A/F, undershoot of the torque along with the decrease of the fuel injection amount is prevented, and the torque fluctuations are restricted.

In the lean SI control (Mode-4), by increasing the intake air amount and increasing the fuel injection amount, the A/F is kept around the stable combustion limitation of the lean SI. By increasing the exhaust loss and lowering the output by retarding the ignition timing, the torque fluctuations are restricted. In the HCCI switching control (Mode-5), since the fuel injection amount is decreased, the A/F of the gas mixture is rapidly brought to a lean state, and ignition by means of the ignition plug is ceased. Thus, switching to the HCCI (Mode-6) can be performed immediately without passing through the large amount of NOx generating region.

Figure 8:
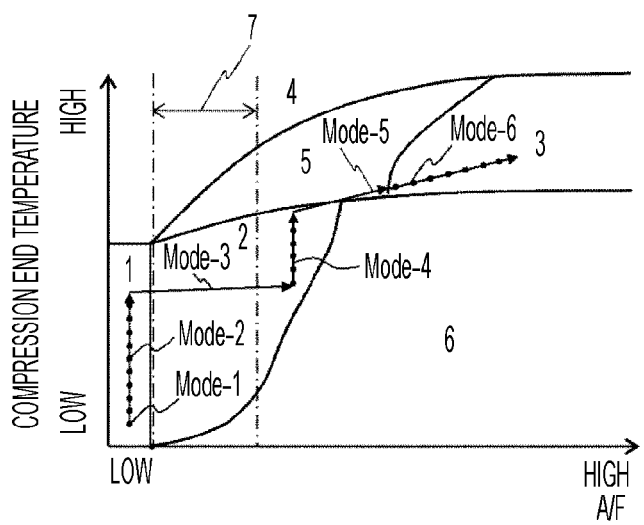
FIG. 8 describes state amounts of the A/F and the compression end temperature per combustion mode at the time of switching from the SI to the HCCI.

FIG. 8 illustrates the A/F and the compression end temperature in a case of switching from the SI to the HCCI. The black dots indicate cycle passing points in transition periods.

At the time of transition from the SI mode (Mode-1) to the lean SI preparation control (Mode-2), the compression end temperature is increased while keeping the A/F around the stoichiometric ratio. At the time of transition from the lean SI preparation control (Mode-2) to the lean SI switching control (Mode-3), the compression end temperature is maintained while bringing the A/F to a lean state immediately. At the time of transition from the lean SI switching control (Mode-3) to the lean SI mode (Mode-4), the fuel injection amount is decreased. At the time of transition from the lean SI mode (Mode-4) to the HCCI switching control (Mode-5), the compression end temperature is increased while keeping the A/F around the stable combustion limitation of the lean SI. At the time of transition from the HCCI switching control (Mode-5) to the HCCI (Mode-6), the compression end temperature is maintained while bringing the A/F to a lean state immediately.

As described above, according to the present embodiment, since the ECU 20 is provided which estimates the compression end temperature and the A/F based on information of the temperature-and-pressure sensor provided on the intake flow path and the air-fuel ratio sensor provided on the exhaust flow path, and, at the transition time of switching from the SI to the HCCI, the intake and exhaust variable valve mechanisms, the fuel injection, and the ignition timing are controlled appropriately in consideration of the estimated compression end temperature and A/F, a cycle generating a large amount of NOx is restricted, and the NOx exhaust amount is decreased.

Since the intake air amount is controlled by the operation angle of the intake valve, the internal EGR amount is controlled by the exhaust valve closing time, and the fuel injection amount is controlled based on the intake air amount estimated from the operation angle of the intake valve to correct the A/F to the targeted air-fuel ratio, the A/F and the compression end temperature can be estimated only by operation of the intake and exhaust valves. As a result, since the reading operation is reduced, the highly controllable switching control can be achieved.

The ECU is provided which estimates the compression end temperature and the A/F based on information of the temperature-and-pressure sensor provided on the intake flow path and the air-fuel ratio sensor provided on the exhaust flow path, and, at the transition time of switching from the SI to the HCCI, the operation mode is determined based on the estimated compression end temperature and A/F. Accordingly, the variable valve mechanisms, the fuel injection, and the ignition timing can be controlled appropriately to comply with the operation mode, and the highly controllable switching control can be achieved.

Hereinbelow, embodiments of the configuration and operation of the ECU 20 for the internal combustion engine 1 employing other switching from the SI to the HCCI than that in the first embodiment will be described with reference to FIGS. 7 to 11. Similar description of the system configuration and the operation of the control device in FIGS. 2 to 5 described in the first embodiment is omitted.

Second Embodiment

In a second embodiment, as for the operation of the control device for the internal combustion engine 1 according to the second embodiment of the present invention, different points from those in the first embodiment will be described with reference to FIGS. 1 to 5 and 7 to 9. In the second embodiment, the configuration and the operation of the ECU 20 for the internal combustion engine 1 in a case in which, at the time of switching from the SI to the HCCI, the operation conditions of the internal combustion engine 1 require a high-load operation, that is, an increase of intake air pressure by means of the turbo supercharger, will be described.

Figure 9:
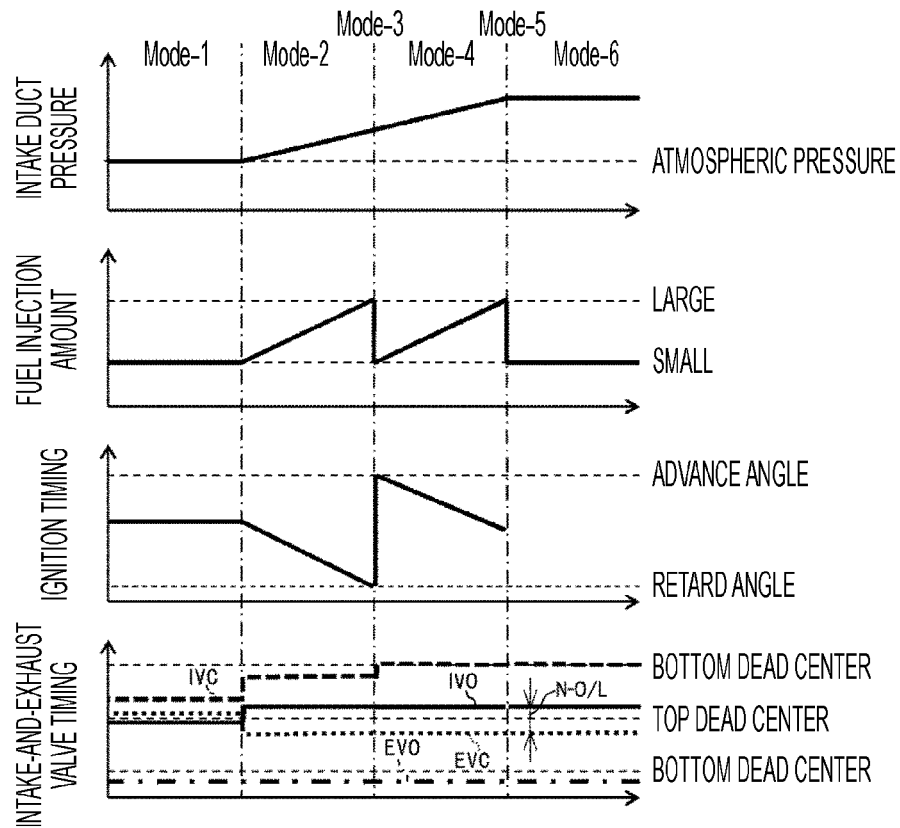
FIG. 9 describes changes of respective control target values at the time of switching from the SI to the HCCI in the second embodiment.

The lean SI preparation control (Mode-2) in the second embodiment will be described. At the time of switching from the SI mode (Mode-1) to the lean SI mode (Mode-4), the lean SI preparation control (Mode-2) is performed as a preparation stage as illustrated in FIG. 9. Relative to the control values of the SI, the intake valve opening time (IVO) is retarded, and the exhaust valve closing time (EVC) is advanced. Since the above valve operation is performed to increase the N-O/L amount, the internal EGR amount increases, and as a result of an increase of the in-cylinder temperature, the compression end temperature increases. By moving the intake valve closing time closer to the piston bottom dead center while further increasing the operation angle of the intake valve, the substantial compression ratio is increased, and the compression end temperature is increased. By accelerating the operation of the turbo supercharger 4, the intake air pressure and the intake air density increase. As a result of the increase of the temperature of the gas mixture due to the above effect, the compression end temperature increases. As a result of the increase of the operation angle of the intake valve and the increase of the intake air pressure, the intake air amount increases. Hence, by increasing the fuel injection amount and retarding the ignition timing, the A/F is kept around the stoichiometric ratio, and by increasing the exhaust loss and lowering the output, the torque fluctuations are restricted, as illustrated in FIG. 7.

The lean SI switching control (Mode-3) in FIG. 5 will be described. In a case in which it is determined at the time of switching from the SI to the lean SI that the operation can be performed in the lean SI mode, the lean SI switching control illustrated in FIG. 9 is performed. By decreasing the fuel injection amount from the control value of the homogeneous SI preparation control and advancing the ignition timing relative to that before changing the A/F, undershoot of the torque along with the decrease of the fuel injection amount can be prevented, the torque fluctuations can be restricted, and switching to the lean SI can be performed.

The lean SI control (Mode-4) in FIG. 5 will be described. At the time of switching from the lean SI mode to the HCCI mode, the lean SI control is performed as a preparation stage as illustrated in FIG. 9. By further moving the intake valve closing time closer to the piston bottom dead center from the control value of the lean SI switching control, the substantial compression ratio is increased, and the compression end temperature is increased. By further accelerating the operation of the turbo supercharger 4, the intake air pressure and the intake air density increase. As a result of the increase of the temperature of the gas mixture due to the above effect, the compression end temperature increases. By increasing the operation angle of the intake valve and the intake air pressure, the intake air amount increases. By increasing the fuel injection amount and retarding the ignition timing, the A/F is kept around the stable combustion limitation of the lean SI, and by increasing the exhaust loss and lowering the output, the torque fluctuations are restricted, as illustrated in FIG. 7.

The HCCI switching control (Mode-5) in FIG. 5 will be described. In a case in which it is determined at the time of switching from the lean SI control to the HCCI that the operation can be performed in the HCCI mode, the HCCI switching control illustrated in FIG. 9 is performed. By decreasing the fuel injection amount from the control value of the lean SI control and ceasing ignition by means of the ignition plug, switching to the HCCI (Mode-6) is performed immediately while restricting generation of the torque fluctuations.

Third Embodiment

In a third embodiment, as for the configuration and the operation of the control device for the internal combustion engine according to the third embodiment of the present invention, different points from those in the first and second embodiments will be described with reference to FIGS. 2 to 5, 7, 8, 10, and 11. The control device for the internal combustion engine in the third embodiment is targeted for a case in which, at the time of switching from the SI to the HCCI, the operation conditions of the internal combustion engine require a higher-load operation, that is, a further increase of intake air pressure by means of the turbo supercharger 4, than in the second embodiment, or aims to improvement in responsiveness of the increase of the in-cylinder temperature.

Figure 10:
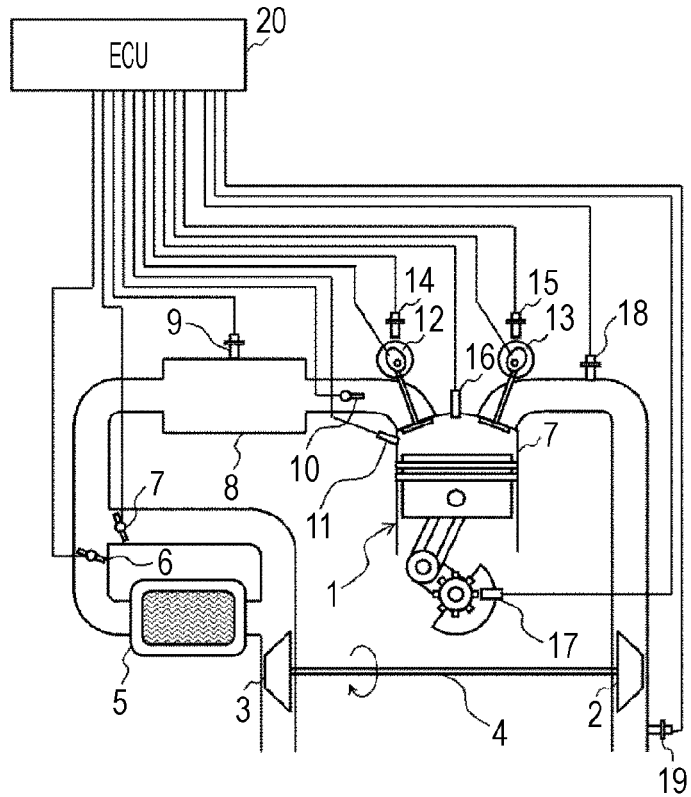
FIG. 10 illustrates a system configuration according to a third embodiment.

FIG. 10 illustrates a system configuration according to the third embodiment of the present invention. The basic configuration is similar to the system configurations according to the first and second embodiments of the present invention described in FIG. 1. The configuration further on the downstream side than the compressor 3 in the third embodiment differs from those in the first and second embodiments. The downstream of the compressor 3 is bifurcated into two flow paths, and a first flow path is provided with the intercooler 5. At the downstream of the intercooler 5, the first throttle valve 6, serving as "a bypass valve," adapted to throttle the intake flow path to control the intake air amount flowing into the cylinder 7 is provided. A second flow path is provided with a second throttle valve 7 adapted to throttle the intake flow path to control the intake air amount flowing into the cylinder 7. Each of the throttle valves 6 and 7 is an electronic control throttle valve enabling a valve opening to be controlled independently from an accelerator pedal pressing amount. By changing the ratio between the opening of the first throttle valve 6 and the opening of the second throttle valve 7, the intake air temperature can be controlled. The first flow path and the second flow path join together at the downstream portions of the throttle valves 6 and 7, and to the downstream of the throttle valves 6 and 7 is connected the intake manifold 8.

Figure 11:
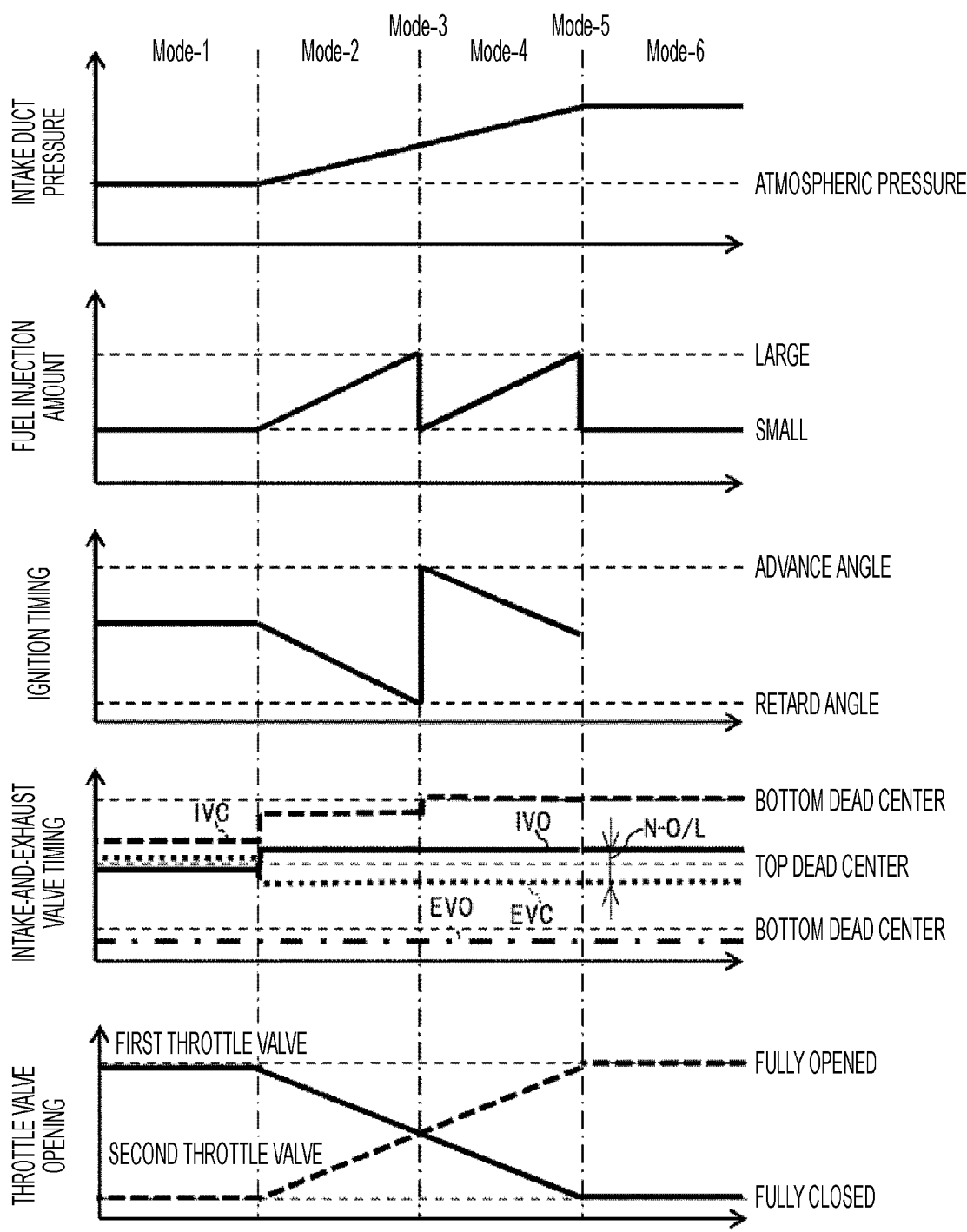
FIG. 11 describes changes of respective control target values at the time of switching from the SI to the HCCI in the third embodiment.

The lean SI preparation control (Mode-2) in the third embodiment in FIG. 5 will be described. At the time of switching from the SI mode (Mode-1) to the lean SI mode (Mode-4), the lean SI preparation control (Mode-2) is performed as a preparation stage as illustrated in FIG. 11. Relative to the control values of the SI, the intake valve opening time (IVO) is retarded, and the exhaust valve closing time (EVC) is advanced. Since the above valve operation is performed to increase the N-O/L amount, the internal EGR amount increases, and as a result of an increase of the in-cylinder temperature, the compression end temperature increases. Further, by moving the intake valve closing time closer to the piston bottom dead center while increasing the operation angle of the intake valve, the substantial compression ratio is increased, and the compression end temperature is increased. Further, by accelerating the operation of the turbo supercharger 4, the intake air pressure and the intake air density increase.

As a result of the increase of the temperature of the gas mixture due to the above effect, the compression end temperature increases. By gradually bringing the openings of the first and second throttle valves to half-open states to decrease the amount of air flowing in the intercooler 5 and increase the temperature of air taken in the internal combustion engine, the compression end temperature at the time of the compression stroke increases. As a result of the increase of the operation angle of the intake valve and the increase of the intake air pressure, the intake air amount increases. Hence, by increasing the fuel injection amount and retarding the ignition timing, the A/F is kept around the stoichiometric ratio, and by increasing the exhaust loss and lowering the output, the torque fluctuations are restricted, as illustrated in FIG. 7.

The lean SI switching control (Mode-3) in FIG. 5 will be described. In a case in which it is determined at the time of switching from the SI to the lean SI that the operation can be performed in the lean SI mode, the lean SI switching control illustrated in FIG. 11 is performed. By decreasing the fuel injection amount from the control value of the lean SI preparation control and advancing the ignition timing relative to that before changing the A/F as illustrated in FIG. 7, undershoot of the torque along with the decrease of the fuel injection amount can be prevented, the torque fluctuations can be restricted, and switching to the lean SI can be performed immediately.

The lean SI control (Mode-4) in FIG. 5 will be described. At the time of switching from the lean SI mode to the HCCI mode, the lean SI control is performed as a preparation stage as illustrated in FIG. 11. By further moving the intake valve closing time closer to the piston bottom dead center from the control value of the lean SI switching control, the substantial compression ratio is increased, and the compression end temperature is increased. Further, by accelerating the operation of the turbo supercharger 4, the intake air pressure and the intake air density increase.

As a result of the increase of the temperature of the gas mixture due to the above effect, the compression end temperature increases. By gradually bringing the opening of the first throttle valve to a fully-open state and gradually bringing the opening of the second throttle valve to a fully-open state to decrease the amount of air flowing in the intercooler 5 and increase the temperature of air taken in the internal combustion engine, the compression end temperature at the time of the compression stroke increases. By increasing the operation angle of the intake valve and the intake air pressure, the intake air amount increases. Hence, by increasing the fuel injection amount and retarding the ignition timing, the A/F is kept around the stable combustion limitation of the lean SI, and by increasing the exhaust loss and lowering the output, the torque fluctuations are restricted, as illustrated in FIG. 7.

The HCCI switching control (Mode-5) in FIG. 5 will be described. In a case in which it is determined at the time of switching from the lean SI control to the HCCI that the operation can be performed in the HCCI mode, the HCCI switching control illustrated in FIG. 11 is performed. By decreasing the fuel injection amount from the control value of the lean SI control and ceasing ignition by means of the ignition plug, switching to the HCCI (Mode-6) is performed immediately while restricting generation of the torque fluctuations.

According to the present embodiment, the in-cylinder temperature can be controlled by the N-O/L period and the operation angle of the intake valve, the intake air temperature can be controlled by control of the intercooler 5 and the throttle valve at the downstream of the bypass duct, and the intake air temperature can be controlled by control of the intake air pressure by means of the supercharger. Accordingly, temperature control by the control unit optimal to operation conditions can be performed. As a result, in the operation transition time requiring responsiveness, highly responsive temperature control can be performed, and control having high switching responsiveness can be achieved.

REFERENCE SIGNS LIST 1 internal combustion engine
5 intercooler
7 cylinder
12 intake valve
13 exhaust valve

The invention claimed is:

1. A control apparatus for an internal combustion engine, comprising:
an electronic control device configured to control switching among a plurality of combustion modes each having a different air-fuel ratio and compression end temperature in a cylinder from each other,
wherein the plurality of combustion modes include a first combustion mode having a first air-fuel ratio, a second combustion mode having a second air-fuel ratio, and an intermediate combustion mode having a third air-fuel ratio,
wherein, between switching from the first combustion mode having the first air-fuel ratio to the second combustion mode having the second air-fuel ratio, the electronic control device causes the engine to be in the intermediate combustion mode having the third air-fuel ratio, and
wherein, in the intermediate combustion mode, the compression end temperature is increased and the third air-fuel ratio is different from each of the first air-fuel ratio of the first combustion mode and the second air-fuel ratio of the second combustion mode.

2. The control apparatus for an internal combustion engine according to claim 1, wherein, in the intermediate combustion mode, the third air-fuel ratio is kept constant while increasing an air amount and the compression end temperature in the cylinder.

3. The control apparatus for an internal combustion engine according to claim 2, wherein the air amount in the cylinder is increased by at least one of increasing intake air pressure in the cylinder and increasing an operation angle of an intake valve.

4. The control apparatus for an internal combustion engine according to claim 2, wherein the third air-fuel ratio is maintained by retarding ignition timing while increasing the air amount and a fuel injection amount in the cylinder.

5. The control apparatus for an internal combustion engine according to claim 1, wherein, in the first combustion mode, the first air-fuel ratio is kept at a stoichiometric ratio.

6. The control apparatus for an internal combustion engine according to claim 1, wherein the first combustion mode is a spark ignition combustion mode, the intermediate combustion mode is a homogeneous lean spark ignition combustion mode, and the second combustion mode is a compression self ignition combustion mode.

7. The control apparatus for an internal combustion engine according claim 1, wherein the compression end temperature is increased by at least one of moving a closing time of an intake valve closer to a piston bottom dead center, setting an opening time of the intake valve later than a closing time of an exhaust valve causing negative overlap, and closing a bypass valve of an intercooler.

8. The control apparatus for an internal combustion engine according to claim 1, wherein switching from the first combustion mode to the second combustion mode is performed under a non-supercharging condition.

9. The control apparatus for an internal combustion engine according to claim 1, wherein the electronic control device estimates the compression end temperature and the third air-fuel ratio based on a first measurement at an intake flow path and a measurement at an exhaust flow path, respectively.

* * * * *